Patented July 20, 1954

2,684,357

UNITED STATES PATENT OFFICE 2,684,357

STABILIZED ACTIVATORS AND THEIR USE IN EMULSION POLYMERIZATION

James E. Troyan, Lewiston, N. Y., and Weldin G. Chapman, Phillips, Tex., assignors to Phillips Petroleum Company, a corporation of Delaware No Drawing. Application January 4, 1950, Serial No. 136,844

13 Claims. (Cl. 260—84.1)

This invention relates to polymerization of conjugated diolefins in aqueous emulsions. In one embodiment it relates to preparing synthetic rubber by emulsion polymerization using a highly active and stable activator system.

In the production of rubber-like elastomers various polymerization recipes have been developed in order to provide polymers of superior physical properties. Variations in operating techniques have also been introduced in order to effect further improvements in the properties of the product. Recent developments have shown that synthetic elastomers having greatly improved properties may be obtained if polymerization reactions are effected at low temperatures. Since conversion rates generally decrease rapidly as the temperature is decreased, faster recipes are necessary in order that these reactions may be carried out on a practical basis. In order to accomplish the desired results at lower temperatures, a number of polymerization recipes have been provided. Outstanding among these are those in which a peroxide or hydroperoxide is a key component, and those in which a diazothioether is a key component. The peroxides and hydroperoxides are usually used in redox recipes, which include a combination of an oxidant, a reductant, and an oxidation catalyst. In this type of recipe the peroxide or hydroperoxide is the oxidant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. As the oxidant in such a recipe, there may be used an inorganic peroxide, such as hydrogen peroxide, a pernitrate, a persulfate, a permanganate, or the like, or an organic peroxide such as benzoyl peroxide, or an organic hydroperoxide such as tertiary butyl hydroperoxide, methyl cyclohexyl hydroperoxide, or cumene hydroperoxide. In another type of recipe a diazothioether is the key component, and while it may be used alone, it is preferably used in combination with a water-soluble ferricyanide which is a salt of a monovalent cation, such as ammonium or an alkali metal. In all of these recipes, it is usually desirable to include a modifier, such as a mercaptan, and an emulsifying agent.

It has been found that the oxidation catalyst used in such polymerization recipes is a very important part of the recipe, and that certain specific improvements in its preparation result in markedly increasing the rate of polymerization and frequently also favorably influence the characteristics of the reaction mixture. Usually this oxidation catalyst comprises a compound of a multivalent metal such as iron, manganese, copper, vanadium, cobalt, and the like, and most commonly is a water-soluble iron salt. The multivalent metal ion of such compounds can readily pass from a low valence state to a higher valence state, and vice versa. Sometimes the compound, when present in its lower valence state, can function in the dual role of reduction and oxidation catalyst.

One commonly used redox catalyst is iron pyrophosphate. In a redox system comprising hydrogen peroxide and organic mercaptan, used as oxidant and reductant respectively, ferric pyrophosphate, prepared by addition of a ferric salt to an aqueous solution of sodium pyrophosphate, has been found to be a useful catalyst. With another class of redox system, comprising a cumene hydroperoxide and sugar, ferrous pyrophosphate has been found to be more effective as a catalyst, as is more fully discussed in Kolthoff application Serial No. 751,955, filed June 2, 1947. However, ferric pyrophosphate can also be used. When carrying out a polymerization with the ferrous system, certain difficulties are encountered. For example, if the catalyst is prepared in the form of a so-called "activator solution" by adding ferrous sulfate to an aqueous solution of sodium pyrophosphate, the activator must be used within a short period of time, otherwise oxidation by the atmosphere impairs its potency, so that diminished and erratic polymerization rates are obtained. Further, the solid portion of the "activator solution" which originally is in the desired finely dispersed form tends to cake into large particles on standing, thus making it difficult to obtain a representative sample for charging to a polymerization recipe. Redispersion is not readily accomplished by ordinary stirring or shakeup but may be effected by grinding in a colloidal mill or similar device.

In preparing activator solutions, a ferrous or ferric salt is added to a solution of sodium pyrophosphate. Ferrous and ferric pyrophosphate are formed by metathesis and these compounds combine further to form pyrophosphate complexes, such as the well known soluble ferric pyrophosphate, $Fe_4(P_2O_7)_3.3Na_4P_2O_7.xH_2O$. For this reason it has become customary to speak of ferrous pyrophosphate and ferric pyrophosphate activators without specifying the source of the ferrous or ferric ions, that is, whether derived from ferrous sulfate or some other salt, and without specifying to what extent the resulting pyrophosphates have been complexed. It can be mentioned that the aforementioned "soluble ferric pyrophosphate" has been found to be a very convenient source of ferric ions for the preparation of ferric activators.

With a ferrous pyrophosphate-cumene hydroperoxide system, a molecular excess of cumene hydroperoxide with respect to ferrous ion must be present to obtain optimum polymerization. With ferric pyrophosphate, on the other hand, this limitation is absent and polymerization can be conducted with amounts of cumene hydroperoxide which are much lower than are required with an equivalent concentration of ferrous salt. However, under the best attainable conditions the rate of polymerization is ordinarily no faster than about 67 per cent of what can be obtained with ferrous pyrophosphate. It might be thought that a mixture of ferrous and ferric salts would possess certain advantages and such indeed has been found to be the case. With such mixtures the limiting ratio of cumene hydroperoxide to iron can be lowered without adversely affecting the high rates of polymerization obtainable with ferrous pyrophosphate activation.

We have now found that, when an emulsion polymerization of a conjugated diolefin is carried out to produce synthetic rubber in a system containing an oxidant and an oxidation catalyst such as just discussed, surprising improvements are obtained in the stability of the oxidation catalyst when an acidic compound is added to the activator composition to lower its pH to a value in the range from 3 to 8.5, preferably from 5 to 8.0. Our treated activators, even after severe exposure to the action of air or oxygen, are capable of promoting sustained high polymerization rates. Further, the tendency of the finely divided activator solids to agglomerate with ageing is eliminated. According to our invention, the activator composition is prepared by dissolving in water a salt of a multivalent metal as previously discussed, a pyrophosphate of a monovalent cation, such as alkali metal or ammonium, and an acidic compound to obtain an activator composition having a lowered pH as indicated previously. The acidic substance so stabilizes the activator composition that an inert atmosphere is no longer needed during its preparation and storage. When operating according to the method of this invention, ferrous pyrophosphate activators, and the like, can be prepared and stored in the presence of air with substantially no indication of oxidation and therefore no loss of activity. These activators are unusually versatile in that they are applicable in recipes containing very small amounts of iron, or other multivalent metal, say 0.01 millimol of salt per 100 grams of monomers, or they may be employed when the multivalent metal content is as high as 3.0 millimols per 100 grams of monomers.

We prefer to prepare the activator solution with the multivalent metal in its lower valence state, and in such instances the use of a separate reductant in the polymerization system is frequently unnecessary, particularly when operating at sub-freezing polymerization temperature with an alcohol present in the aqueous medium When the activator solution is prepared with a salt of a multivalent metal in its higher valence state it is usually necessary also to have a reductant, such as a reducing sugar, present while the solution is heated. If desired, such a reductant may also be present when the multivalent metal is present in its lower valence state.

The acidic substance is preferably incorporated into the activator solution prior to heating, but beneficial stabilizing effects result if it is added to the solution after heating, if this heating is carried out in the absence of contact with free oxygen. When the components are mixed prior to heating and the resulting solution is heated in the presence of air, the resulting composition can be stored for a period of from several hours to several days, say 7 to 15 days, with substantially no loss of activity. If desired, inert gas blanketing may be employed during the mixing, heating, or storage of the activator composition but this practice is not considered necessary. Indeed one of the chief advantages of the invention is that the activator can be prepared in the presence of free oxygen. In order to get our improved results to the greatest extent at low activator levels it is necessary to add the multivalent metal salt, pyrophosphate, and the acidic substance to water and then to heat the activator composition to a temperature between 40 and 100° C. In preparing the activator both the pyrophosphate and the multivalent metal salt may be added to the same portion of water and the acidic substance then added. Alternatively, the pyrophosphate may be dissolved in part of the water and the multivalent metal salt dissolved in the other part of the water. The two solutions are then mixed. The acid may be added after mixing or it may be added to one of the individual solutions before mixing.

An object of this invention is to polymerize unsaturated organic compounds.

Another object of this invention is to produce an improved synthetic rubber.

Still another object of this invention is to produce a stabilized activator for an emulsion polymerization reaction.

Still another object of this invention is to produce a more active activator solution for use in emulsion polymerization, where an oxidant is an essential ingredient of the polymerization mixture.

A further object of this invention is to provide, and use, activator compositions comprising a pyrophosphate of a multivalent metal, which is stable in the presence of free oxygen.

A still further object of this invention is to provide, and use, a stable ferrous pyrophosphate activator solution for use in emulsion polymerization.

Further objects and advantages of this invention will become apparent to one skilled in the art from the accompanying disclosure and discussion.

In effecting emulsion polymerization of a monomeric material, particularly when a batch-type or semibatch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solution and oxidant intermittently, or continuously, during the course of the reaction. If the operation is carried out continuously, streams of the various ingredients are admixed in somewhat the same order prior to their final introduction into the polymerization reaction zone.

The activator solution which is prepared in accordance with our invention is usually prepared entirely separately and somewhat prior to its use in the polymerization reaction. Each ingredient is dissolved in water in a concentration between about 0.1 and 10 parts by weight per 100 parts of water used for the activator composition. The three essential ingredients hereinbefore discussed are added to water and the resulting activator composition heated to a temperature between 40 and 100° C., preferably between 50 and 80° C., for a period of from 5 to 90 minutes, more usually from 30 to 60 minutes. However, when desired, such as when using an activator level of about 1.0 millimols of activator per 100 grams of monomers in the polymerization, the heating period may be omitted entirely. In the majority of cases, the salt of the multivalent metal and the pyrophosphate are present in an amount ranging from 0.8 to 1.2 mols with respect to one mol of the other, and the resulting activator composition and oxidant are subsequently added to the polymerization zone in amounts so that the relative amounts of the multivalent metal salt and the oxidant are present in an amount ranging from about 0.65 to 1.5 mols with respect to one mol of the other. It is usually preferred, however, that the amounts of the multivalent metal ion and pyrophosphate be present in equimolar quantities, and the amount of oxidant be present in excess of the molecular equivalent of the multivalent metal ion. We prefer to see to it that the strength of our activator composition is so regulated, and the amount of activator composition added is also so regulated, that there is added to the reaction mixture from 0.01 to 3 millimol parts of multivalent metal and pyrophosphate and oxidant per 100 parts by weight of monomeric material, with the preferred quantities being in the range from 0.1 to 1.2 millimol parts by weight of multivalent metal.

As previously stated, it is usually desirable that the multivalent metal be present in its lower valence state. With some recipes, it is unnecessary to include an organic reducing agent either in the activator solution or in the polymerization mixture. However, particularly at temperatures above 0° C., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in its lower valence state when the activator solution is ready for addition to the polymerization mixture.

It is usually preferred that the multivalent ion be iron, and the activator solution may be prepared from any of the readily available soluble iron salts, such as ferrous sulfate, ferric sulfate, ferrous nitrate, and the like. A pyrophosphate of sodium or potassium is also usually used in preparing the activator solution. Apparently the ferrous salt and the pyrophosphate interreact to form some kind of a complex compound. The acid added in accordance with the present invention not only tends to stabilize the aqueous activator complex from deleterious effects of free oxygen, but may also influence in some way the composition or molecular structure of the complex.

The monomeric material polymerized to produce polymers by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins, such as styrene, various alkyl styrenes, p-chlorostyrene, p-methoxystyrene, alpha-methylstyrene, vinylnaphthalene and similar derivates thereof, and the like; acrylic and substituted acrylic acids and their esters, nitriles and amides, such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

At low polymerization temperatures, particularly below freezing, it is desirable to include inorganic salts or alcohols in the aqueous phase. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 180 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other low-boiling alcohols such as ethanol, however, are frequently too soluble in the liquid monomeric material to permit satisfactory operation. If the resulting latex tends to gel at low reaction temperatures, a larger proportion of aqueous phase should be used. It is generally preferred that the emulsion be of an "oil in water" type, with the ratio of aqueous medium to monomeric material between about 1.5:1 and about 2.75:1, in parts by weight. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 85 per cent of the monomeric material is polymerized.

Emulsifying agents which are applicable in these low temperature polymerizations are materials such as potassium laurate, potassium oleate, salts of rosin acids, mixtures of fatty acid salts and rosin acid salts, and the like. However, other emulsifying agents, such as non-ionic emulsifying agents, salts of alkyl aromatic sulfonic acids, salts of alkyl sulfates, and the like which will produce favorable results under the conditions of the reaction, can also be used in practicing the invention, either alone or in admixture with soaps.

The mercaptans applicable in this invention are usually alkyl mercaptans, and these may be of primary, secondary, or tertiary configuration, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$ and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

Our new activator solutions can be used to advantage in systems wherein the oxidizing agent is a peroxidic-type material, or a compound which functions in the capacity of an oxidizing agent, such as a diazothioether which is soluble in a liquid hydrocarbon material, such as liquid butadiene. We prefer to use organic peroxides and hydroperoxides, such as may be represented by the formula R'OOR'', where R' may be an alkyl, aryl, acyl, aralkyl, or cycloalkyl group, and R'' may be hydrogen or an alkyl, aryl, acyl, aralkyl, or cycloalkyl group. Specific examples of these compounds include benzoyl peroxide, tertiary-butyl hydroperoxide, cumene hydroperoxide, (phenyldimethylmethyl hydroperoxide), and methylcyclohexane hydroperoxide. Preferred diazthioethers include 2-(4-methoxybenzene diazothiomercapto)-naphthalene, 1-(2,4-dimethylbenzene diazomercapto)-naphthalene, and the like.

Temperatures applicable for polymerization employing our improved activator compositions may range from −40 to +70° C., with the range −40 to +5° C. being preferred.

The acidifying compounds to which our invention applies are inorganic and organic acids and acid salts capable of lowering the pH of the activator compositions to the desired value. Typical examples of the acidic compounds are mineral acids, such as hydrochloric acid, sulfuric acid, nitric acid and phosphoric acid, low molecular weight fatty acids, such as acetic acid and propionic acid, other organic acids, such as oxalic acid, and acid salts, such as sodium acid sulfate, and the like. These compounds are merely illustrative, and from our disclosure the use of other compounds will be obvious to one skilled in the art.

As stated above, the multivalent metal salt and the pyrophosphate are dissolved in water in a concentration between 0.1 and 10 parts by weight per 100 parts of water used for the activator composition. It should be noted, however, that in most cases the more dilute activator compositions are less effective in their activating influence upon a polymerization reaction than the less dilute compositions.

Advantages of this invention are illustrated by the following examples.

Example I

The polymerization recipe employed in this example was as follows:

| Ingredient: | Parts by weight |
|---|---|
| Water | 180 |
| 1,3-butadiene | 70 |
| Styrene | 30 |
| Methanol | 40 |
| Potassium laurate | 5.0 |
| Cumene hydroperoxide | 0.1 |
| Mercaptan blend [1] | 0.2 |
| Potassium chloride | 0.4 |
| Activator composition: | |
|   Sodium pyrophosphate, $Na_4P_2O_7$ | 0.136 |
|   Ferrous sulfate, $FeSO_4 \cdot 7H_2O$ | 0.14 |
|   Hydrochloric acid stabilizer | Variable |

[1] A blend of tertiary $C_{12}$, $C_{14}$ and $C_{16}$ alkyl mercaptans in a ratio of 3:1:1 parts by weight.

The polymerization reactions were all carried out in glass bottles at a temperature of 14° F. The order in which materials were charged to bottles was as follows:

(a) Water, potassium laurate, potassium chloride and methanol.
(b) Styrene, mercaptan.
(c) Butadiene.
(d) Activator composition after bottles containing preceding mixture had been allowed to rotate in a 14° F. bath for 0.5 hour.
(e) Cumene hydroperoxide.

The following activator preparation was employed:

(a) Sodium pyrophosphate was dissolved in water.
(b) Ferrous sulfate was dissolved in water.
(c) Acidic substance (if used) added to adjust activator pH.
(d) The resultant activator composition was heated to 140° F., unless otherwise specified, and then cooled.

The water used in the activator preparation was part of the 180 parts in the polymerization receipe which was withheld from the reactor when the bulk of the water was charged. The acid stabilizer was omitted in the preparation of some of the activator compositions which were employed in polymerization reactions to serve as control runs. The final activator compositions which had been stabilized had pH values between 7.0 and 7.5, while the unstabilized activator compositions each had a pH value of about 9.4.

Both heated and unheated, aged and unaged activator compositions were tested in polymerization reactions. The ageing procedure was accomplished by passing a stream of air through each activator composition for one hour. This is a very drastic treatment, giving much more severe exposure to free oxygen than is encountered in ordinary plant practice. Consequently, polymerization rates in plant practice using activators aged or exposed to air by ordinary plant procedures of handling would be expected to be even faster than the rates obtained in these experiments using the activators aged as described.

A summary of the pertinent activator and polymerization data for experimental runs appears in the following table.

| Activator | | | Polymerization | | | |
|---|---|---|---|---|---|---|
| | | | Unaged | | Aged | |
| Hydrochloric Acid Stabilized | Water, Parts by Weight | Heated | Time, Hours | Percent Conversion | Time, Hours | Percent Conversion |
| yes | 4.0 | no | 18.0 | 65.8 | 13.9 | 51.2 |
| no | 4.0 | no | 18.0 | 61.5 | 13.9 | 19.9 |
| yes | 5.0 | yes | 18.0 | 78.2 | 14.0 | 35.7 |
| no | 5.0 | yes | 18.0 | 80.4 | 14.2 | 16.8 |
| no | 10.0 | yes | 18.0 | 68.7 | 14.5 | 4.4 |
| yes | 24.0 | yes | 15.0 | 34.2 | 14.2 | 12.2 |
| no [1] | 24.0 | yes | | | 14.1 | 0.0 |

[1] In this run the potassium chloride was added to the activator instead of being added to the reactor initially with the water, soap and methanol.

The table clearly shows the greatly increased stability of the activators stabilized with acid compared to the activators which had not been stabilized with acid. It will also be noted that the activator compositions made with larger amounts of water are less active. However, acid treatment of these activators also greatly increases their stability as is shown in the table.

Example II

The polymerization recipe used in this example was as follows:

| Ingredient: | Parts by weight |
|---|---|
| Water | 180 |
| 1,3-butadiene | 70 |
| Styrene | 30 |
| Methanol | 40 |
| Potassium laurate | 5.0 |
| Cumene hydroperoxide | 0.21 |
| Mercaptan blend[1] | 0.2 |
| Potassium chloride | 0.4 |
| Activator composition: | |
|   Sodium pyrophosphate, $Na_4P_2O_7$ | 0.30 |
|   Ferrous sulfate, $FeSO_4 \cdot 7H_2O$ | 0.31 |
|   Acidic stabilizer | Variable |

[1] A blend of tertiary $C_{12}$, $C_{14}$ and $C_{16}$ alkyl mercaptans in a ratio of 3:1:1 parts by weight.

The charging procedure and the procedure for preparation of the activator compositions were the same as described in Example I. The polymerization reactions were all carried out in glass bottles at a temperature of 14° F.

A series of acid stabilized activators was prepared using 10 parts by weight of water in each activator composition. Each activator composition was tested in a polymerization reaction after ageing in a small beaker open to the atmosphere. A summary of the pertinent activator and polymerization data appears in the following table.

| Activator | | | Polymerization | |
|---|---|---|---|---|
| Acid Used | pH | Heated | Period Activator Aged, Hours | Time Required For 60% Conversion |
| Ortho-Phosphorous | 7.2 | yes | 168 | 13.7 |
| Oxalic | 7.5 | yes | 168 | 11.9 |
| Acetic | 7.1 | yes | 168 | 11.7 |
| Hydrochloric | 7.5 | no | 36 | 10.2 |
| Hydrochloric | 7.5 | yes | 36 | 10.2 |

It will be seen from the data that the aged acid stabilized activators promoted a high rate of conversion. The short polymerization times for 60 per cent conversion of the monomers are excellent for the low temperature employed, as will be understood by those skilled in the art. In addition, the solids in the aged activators did not cake at all and were easily redispersed to a very fine particle size slurry. An activator composition prepared in the same manner except that it was not stabilized with an acid caked together badly after a week of ageing and was extremely difficult to redisperse.

As will be evident to those skilled in the art, various modifications of this invention can be made, or followed, in the light of the foregoing disclosure and discussion, without departing from the spirit or scope of the disclosure or from the scope of the claims.

We claim:

1. In the production of synthetic rubber by polymerization of a monomeric material comprising 65 to 90 per cent 1,3-butadiene and 35 to 10 per cent styrene while dispersed in aqueous emulsion at a polymerization temperature below 0° C., the improvement which comprises admixing at a polymerization temperature below 0° C. said monomeric material, an aqueous medium in a weight ratio to said monomeric material between 1.5:1 and 2.75:1, an emulsifying agent, a tertiary alkyl mercaptan having 12 to 16 carbon atoms per molecule in an amount between 0.05 and 1.4 parts per 100 parts of said monomeric material, and an activator solution prepared by dissolving in water ferrous sulfate, sodium pyrophosphate and sufficient hydrochloric acid to produce a pH of the solution within the range of 3 to 8.5, with the first two in equimolar proportions, heating the resulting solution to 40 to 80° C. for 5 to 90 minutes and subsequently cooling said solution, with the composition of said activator solution and the amount added being such that 0.01 to 1.0 millimol part of ferrous sulfate and sodium pyrophosphate are added per 100 parts by weight of said monomeric material, and subsequently adding to said mixture cumene hydroperoxide in an amount in excess of one molecular equivalent of said ferrous salt, maintaining said materials admixed at a polymerization temperature below 0° C. for a time sufficient to effect polymerization of 50 to 85 per cent of said monomeric material, and recovering from said reaction mixture polymers so produced.

2. In the production of synthetic rubber by polymerization of a monomeric material comprising 65 to 90 per cent 1,3-butadiene and 35 to 10 per cent styrene while dispersed in aqueous emulsion at a polymerization temperature below 0° C., the improvement which comprises admixing at a polymerization temperature below 0° C. said monomeric material, an aqueous medium in a weight ratio to said monomeric material between 1.5:1 and 2.75:1, an emulsifying agent, a tertiary alkyl mercaptan having 12 to 16 carbon atoms per molecule in an amount between 0.05 and 1.4 parts per 100 parts of said monomeric material, and an activator solution prepared by dissolving in water ferrous sulfate, sodium pyrophosphate and sufficient mineral acid to produce a pH of the solution within the range of 3 to 8.5, with the first two in equimolar proportions, heating the resulting solutions to 40 to 80° C. for 5 to 90 minutes and subsequently cooling said solution, with the composition of said activator solution and the amount added being such that 0.01 to 1.0 millimol part of ferrous sulfate and sodium pyrophosphate are added per 100 parts by weight of said monomeric material, and subsequently adding to said mixture cumene hydroperoxide in an amount in excess of one molecular equivalent of said ferrous salt, maintaining said materials admixed at a polymerization temperature below 0° C. for a time sufficient to effect polymerization of 50 to 85 per cent of said monomeric material, and recovering from said reaction mixture polymers so produced.

3. In the production of synthetic rubber by polymerization of a monomeric material comprising 65 to 90 per cent 1,3-butadiene and 35 to 10 per cent styrene while dispersed in aqueous emulsion at a polymerization temperature below 0° C., the improvement which comprises admixing at a polymerization temperature below 0° C. said monomeric material, an aqueous medium in a weight ratio to said monomeric material between 1.5:1 and 2.75:1, an emulsifying agent, a tertiary alkyl mercaptan having 12 to 16 carbon atoms per molecule in an amount between 0.05 and 1.4 parts per 100 parts of said monomeric material, and an activator solution prepared by dissolving in water ferrous sulfate, sodium pyrophosphate and sufficient acetic acid to produce a pH of the solution within the range of 3 to 8.5, with the first two in equimolar proportions, heating the resulting solution to 40 to 80° C. for 5 to 90 minutes and subsequently cooling said solution, with the composition of said activator solution and the amount added being such that 0.01 to 1.0 millimol part of ferrous sulfate and sodium pyrophosphate are added per 100 parts by weight of said monomeric material, and subsequently adding to said mixture cumene hydroperoxide in an amount in excess of one molecular equivalent of said ferrous salt, maintaining said materials admixed at a polymerization temperature below 0° C. for a time sufficient to effect polymerization of 50 to 85 per cent of said monomeric material, and recovering from said reaction mixture polymers so produced.

4. In the production of synthetic rubber by polymerization of a monomeric material comprising 65 to 90 per cent 1,3-butadiene and 35 to 10 per cent styrene while dispersed in aqueous emulsion at a polymerization temperature below 0° C., the improvement which comprises admixing at a polymerization temperature below 0° C. said monomeric material, an aqueous medium in a weight ratio to said monomeric material between 1.5:1 and 2.75:1, an emulsifying agent, a tertiary alkyl mercaptan having 12 to 16 carbon atoms per molecule in an amount between 0.05 and 1.4 parts per 100 parts of said monomeric material, and an activator solution prepared by dissolving in water ferrous sulfate, sodium pyrophosphate and sufficient low molecular weight fatty acid to produce a pH of the solution within the range of 3 to 8.5, with the first two in equimolar proportions, heating the resulting solution to 40 to 80° C. for 5 to 90 minutes and subsequently cooling said solution, with the composition of said activator solution and the amount added being such that 0.01 to 1.0 millimol part of ferrous sulfate and sodium pyrophosphate are added per 100 parts by weight of said monomeric material, and subsequently adding to said mixture cumene hydroperoxide in an amount in excess of one molecular equivalent of said ferrous salt, maintaining said materials admixed at a polymerization temperature below 0° C. for a time sufficient to effect polymerization of 50 to 85 per cent of said monomeric material, and recovering from said reaction mixture polymers so produced.

5. In the production of synthetic rubber by polymerization of a monomeric material comprising 65 to 90 per cent 1,3-butadiene and 35 to 10 per cent styrene while dispersed in aqueous emulsion at a polymerization temperature below 0° C., the improvement which comprises admixing at a polymerization temperature below 0° C. said monomeric material, an aqueous medium in a weight ratio to said monomeric material between 1.5:1 and 2.75:1, an emulsifying agent, a tertiary alkyl mercaptan having 12 to 16 carbon atoms per molecule in an amount between 0.05 and 1.4 parts per 100 parts of said monomeric material, and an activator solution prepared by dissolving in water ferrous sulfate, sodium pyrophosphate and sufficient oxalic acid to produce a pH of the solution within the range of 3 to 8.5, with the first two in equimolar proportions, heating the resulting solution to 40 to 80° C. for 5 to 90 minutes and subsequently cooling said solution, with the composition of said activator solution and the amount added being such that 0.01 to 1.0 millimol part of ferrous sulfate and sodium pyrophosphate are added per 100 parts by weight of said monomeric material, and subsequently adding to said mixture cumene hydroperoxide in an amount in excess of one molecular equivalent of said ferrous salt, maintaining said materials admixed at a polymerization temperature below 0° C. for a time sufficient to effect polymerization of 50 to 85 per cent of said monomeric material, and recovering from said reaction mixture polymers so produced.

6. In the production of synthetic rubber by polymerization of a monomeric material comprising 1,3-butadiene while dispersed in aqueous emulsion at a polymerization temperature, the improvement which comprises admixing at a polymerization temperature said monomeric material, an aqueous medium in a weight ratio to said monomeric material between 1.5:1 and 2.75:1, an emulsifying agent, a tertiary alkyl mercaptan having 12 to 16 carbon atoms per molecule in an amount between 0.05 and 1.4 parts per 100 parts of said monomeric material, and an activator solution prepared by dissolving a soluble ferrous salt, a pyrophosphate of a monovalent cation and an acidifying compound in an amount sufficient to reduce the pH of the activator solution to within the range of 3 to 8.5, with the composition of said activator solution and the amount added being such that 0.01 to 1 millimol part of ferrous salt and pyrophosphate are added per 100 parts by weight of said monomeric material, and subsequently adding to said mixture an oxidant in an amount in excess of one molecular equivalent of said ferrous salt, maintaining said materials admixed at a polymerization temperature to effect polymerization of said monomeric material, and recovering from said reaction polymers so produced.

7. The process of claim 6 wherein said polymerization is conducted below 0° C. and in the presence of an organic hydroperoxide as said oxidant.

8. An improved process for producing synthetic rubber, which comprises polymerizing a monomeric material comprising 1,3-butadiene while dispersed in an aqueous emulsion in the presence of cumene hydroperoxide as an oxidant and in the presence of an activator composition prepared by dissolving in water ferrous sulfate, sodium pyrophosphate and sufficient acid to lower the pH of the activator solution to within the range fo 3 to 8.5, heating said solution to a temperature between 40 and 80° C. for a period of 5 to 90 minutes and cooling said solution, and adding the cool solution to the reaction mixture, the amount of said activator solution added and the amount of said constituents present therein being such that, per 100 parts by weight of said monomeric material, there is added 0.1 to 1.2 millimol parts each of ferrous sulfate, sodium pyrophosphate and separately added cumene hydroperoxide.

9. In the catalytic polymerization of a liquid monomeric material comprising a conjugated diolefin while dispersed in an aqueous emulsion to produce synthetic rubber, in which a polymerization catalyst is used comprising an oxidant and an iron pyrophosphate activator composition, the improvement which comprises using as an activator composition comprising said iron pyrophosphate an aqueous solution prepared by dissolving in water a soluble iron salt under conditions such that at least part of said iron is present in the ferrous state, a pyrophosphate of a monovalent cation, and an acidifying compound, heating said solution to a temperature between 40 and 100° C. for 5 to 90 minutes and subsequently cooling the resulting solution, and so incorporating said solution in said aqueous emulsion along with said oxidant that there is added, based upon 100 parts by weight of said monomeric material, 0.01 to 3 millimol parts of iron, pyrophosphate, and oxidant and sufficient acidifying compound to reduce the pH of the activator solution to 3 to 8.5

10. In the catalytic polymerization of a monomeric material comprising a conjugated diolefin while dispersed in an aqueous emulsion to produce synthetic rubber, in which a polymerization catalyst is used comprising an oxidant and a pyrophosphate of a multivalent metal capable of existing in two valence states as an activator composition, the improvement which comprises using as said activator composition an aqueous solution prepared by dissolving in water a pyrophosphate of a monovalent cation, a salt of such a multivalent metal under conditions such that it is present at least in part in a lower valence state, heating said solution to a temperature between 40 and 100° C. for 5 to 90 minutes and subsequently cooling the resulting solution, incorporating in said solution during said preparation sufficient acidifying compound to lower the pH of said solution to 3 to 8.5, and so incorporating said solution in said polymerization along with said oxidant that there is added, based on 100 parts by weight of said monomeric material, 0.01 to 3 millimol parts of said multivalent metal pyrophosphate and oxidant.

11. The process of claim 10, wherein said oxidant is an organic hydroperoxide, said multivalent metal is iron and is added to said activator solution as a ferrous salt in the absence of any reductant, and said activator composition and oxidant are separately added to said polymerization in such amounts that there are equimolar amounts of iron and pyrophosphate and an excess of said oxidant over a molecular equivalent to said iron.

12. The process of claim 10 wherein the acidifying compound is added to said solution prior to said heating.

13. The process of claim 10 wherein the acidifying compound is added to said solution prior to said heating and said solution is heated in the presence of free oxygen.

(References on following page)

References Cited in the file of this patent

UNITED STATES PATENTS

| Number | Name | Date |
|---|---|---|
| 1,882,712 | Andrusso et al. | Oct. 18, 1932 |
| 2,237,822 | Layng | Apr. 8, 1941 |
| 2,366,328 | Fryling | Jan. 2, 1945 |
| 2,383,425 | Stewart | Apr. 21, 1945 |
| 2,456,367 | Britton et al. | Dec. 14, 1948 |

OTHER REFERENCES

Merck's Index, 4th ed., Merck and Co., Rahway, N. J., page 281.

Shearon, Jr., et al., Ind. & Eng. Chem., vol. 40, No. 5, May 1948, pages 769–777.